(No Model.)
T. W. F. SMITTEN.
LINK SLEEVE BUTTON.
No. 320,596. Patented June 23, 1885.
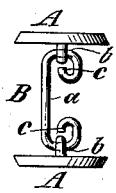
Witnesses:
Inventor:

UNITED STATES PATENT OFFICE.

THOMAS W. F. SMITTEN, OF BROOKLYN, NEW YORK.

LINK SLEEVE-BUTTON.

SPECIFICATION forming part of Letters Patent No. 320,596, dated June 23, 1885.

Application filed June 20, 1884. (No model.)

*To all whom it may concern:*

Be it known that I, THOMAS W. F. SMITTEN, of the city of Brooklyn, in the county of Kings and State of New York, have invented a new and useful Improvement in Link-Buttons, of which the following is a specification.

My invention relates to link-buttons in which the two buttons or button-heads, having eyes, are connected by a link having a hook at one end, whereby one of the buttons may be engaged and disengaged from it, the other button being permanently connected with the link, or having a similar hook at each end, whereby both buttons may be engaged with and disengaged from the link.

In my Letters Patent No. 300,910, dated June 24, 1884, I have shown a link-button the link of which has a hook formed with a swelled portion or enlargement near the extremity thereof, whereby the eye of the button-head cannot be disengaged from the hook, except when brought into proper position relatively thereto. I have now discovered that the same results can be accomplished by another construction of the link—namely, by forming the hook of the link with a terminal portion projecting inward relatively to the hook, the link and button-head being so combined that the head, if moved upon the link while in a plane transverse to the plane of the hook, will strike against the body of the link, and thereby be prevented from further movement before the eye of the button can be disengaged from the hook with its inwardly-projecting end. The link, therefore, forms a guard to prevent the separation of the button-head and link until the head is adjusted into a plane parallel with the plane of the hook, whereupon the head may be readily moved to slip its eye off the hook.

In the accompanying drawings, Figure 1 represents a link-button embodying my invention, the link having two hooks turned in the same direction, and both button-heads being detachable therefrom. Fig. 2 represents a link-button, the link of which has at one end an eye, whereby it is permanently but flexibly connected with the eye of one button-head, and having at the other end a hook turned in a direction opposite to the eye of the link, and having an inwardly-turned portion at its extremity. Fig. 3 represents a link having hooks turned in opposite directions and provided with inwardly-projecting end portions; and Fig. 4 represents a link very similar to that shown in Fig. 3, but slightly modified.

Similar letters of reference designate corresponding parts in all the figures.

In all the figures, A A designate the button-heads, having ordinary eyes, and B designates the link which connects them. In Fig. 2 I have shown one button-head as permanently but flexibly connected with the link by an eye formed in the latter; but in all the other figures the link is of similar construction at opposite ends, and both button-heads are detachable therefrom.

*a* designates the middle portion or body of the link, and at the end or ends, with which the button-head is to be detachably connected, the link is formed with a hook, *b*, the point or end *c* of which is turned inward relatively to the hook.

The link shown in Fig. 1 has its two hooks *b* turned in the same direction, and its ends *c* projecting inward toward the body of the link and into the hooks.

The link shown in Fig. 2 has at one end a hook, *b*, turned in an opposite direction to the eye at the other end of the link, and having its end portion, *c*, projecting inward toward the body of the link and into the hook.

The link shown in Fig. 3 has hooks *b* turned in opposite directions, and terminating in end portions, *c*, which are curved inward toward the body of the link and into the hooks.

The link shown in Fig. 4 is similar to that shown in Fig. 3, save that the end portions *c*, instead of being curved, project straight inward from the extremity of the hooks. These end portions, *c*, turned inward, prevent the button-head from being engaged with or disengaged from the hook of the link when swung to or placed in a position in which the button-head is in a plane transverse to the plane of the hook, as indicated by the dotted lines in Fig. 2. The body of the link forms a guard, against which the head strikes, as shown by dotted lines in Fig. 2, and prevents the movement of the eye of the head on the hook.

To engage the button-eye with or disengage it from the hook, it is necessary to bring the button-head into a plane which is approximately parallel with the plane of the hook, and by slightly turning the button-head when in that position its eye can be slipped off the hook of the link.

To insert the link-button in a cuff, the button-head is removed, the link is slipped through both button-holes at once, and its hook projected beyond the outside of the cuff, and the button-head is then placed in a plane parallel with the plane of the hook, and by slightly turning it its eye is threaded onto the hook, the eye being caused to follow the bend of the end portion, $c$, and hook $b$ by turning the head.

When worn, the eye of the button-head settles down into the button-hole, and the hook on the link is prevented from slipping out of the eye of the button-head by the inwardly-turned end portion, $c$, at the extremity of the hook.

I do not desire to claim herein anything shown or described in my former patent. In my present invention I attain the desired result without the swelling or enlargement of the end of the hook.

I am aware of United States Letters Patent No. 203,618, granted May 14, 1878, to Charles Hein. In those Letters Patent is shown a link having at opposite ends hooks which are turned in the same direction, and are closed or guarded by a separate locking-bar pivoted at the middle of the length of the link, and adapted to be swung in a plane transverse to the plane of the hooks, to open and close them. I do not desire to include such a construction in my invention.

What I claim as my invention, and desire to secure by Letters Patent, is—

The combination, with the button-head and eye of a link-button, of a link having at one or both of its ends a hook, $b$, and an inwardly-turned end portion, $c$, at the extremity of the hook, the body of the link forming a guard to prevent the head from being moved while in a plane transverse to the plane of the hook sufficiently to pass the inwardly-turned end portion, substantially as herein described.

T. W. F. SMITTEN.

Witnesses:
 FREDK. HAYNES,
 EMIL SCHWARTZ.